March 23, 1971  R. B. STANLEY  3,572,136
LINEAR ACTUATOR

Filed March 17, 1969  6 Sheets-Sheet 2

Inventor
Richard B. Stanley.
By Mann, Brown & McWilliams
Attys.

March 23, 1971  R. B. STANLEY  3,572,136
LINEAR ACTUATOR
Filed March 17, 1969  6 Sheets-Sheet 4

Inventor
Richard B. Stanley
By Mann, Brown & McWilliams
Attys.

United States Patent Office 3,572,136
Patented Mar. 23, 1971

3,572,136
LINEAR ACTUATOR
Richard B. Stanley, 4 Coventry on Duxbury, Plum Grove
Village, Rolling Meadows, Ill. 60008
Filed Mar. 17, 1969, Ser. No. 807,506
Int. Cl. F16h 21/16
U.S. Cl. 74—25
6 Claims

ABSTRACT OF THE DISCLOSURE

A device for converting rotary motion to linear motion in which a shaft member and a tubular member are mounted in concentric telescoping relation, and a bearing unit in the form of a plurality of bearing balls rolling on the tubular member and mounted in a special cage or retainer is interposed between the shaft member and the tubular member, and a wedge lock is established between the shaft member and the bearing balls that wedge locks the balls between the two members. The bearing unit is mounted in a fixed plane disposed transversely of the device shaft and tubular member, and the balls are spaced equidistantly about the axes of said members and rotate about individual axes that are canted at an acute angle on the order of two degrees out of parallelism with the longitudinal axes of said members.

My invention relates to, broadly speaking, a linear actuator, and more particularly, to a device for converting rotary motion to linear motion with high force conversion factors over any desired distance at low speed.

Existing mechanical devices for converting rotary motion to linear motion fall into one of three basic groups, namely screw and nut devices which provide reasonable force conversion ratios at low efficiency, ball nut devices which provide high efficiency but with low force conversion ratios, and rack and gear devices which provide low force conversion ratios at low efficiency. So far as I am aware, there was no known mechanical method, prior to my invention, for converting rotary motion to linear motion with both high force conversion ratios at high efficiency.

Furthermore, while the common solenoid type device provides low force application at high speed for a short distance using electrical energy, so far as I am aware, there is no known method of using electrical energy to provide high force and low speed over a comparatively long distance.

One arrangement that has been devised in an effort to meet some of these needs is disclosed in Uhing Pat. 2,940,322. In one form of device disclosed in this patent, an annular ball bearing unit in the form of a ring made up of inner and outer races with bearing balls interposed therebetween embraces a rotating shaft in frictional engagement therewith, with the ring being angularly and eccentrically disposed with respect to the shaft and pressed against same by a spring. The sliding contact that the ring inner race makes with the shaft surface on rotation of the shaft when the ring is disposed at a canted angle with respect to the shaft produces a linear movement of the ring relative to the shaft that is transmitted to any component that the ring is connected to. Variation of the canted angle of the ring with respect to the shaft varies the pitch of the device.

In an alternate converse form, the ring is mounted inside a tubular shaft that is rotated to provide linear movement of the ring.

While the Uhing device provides the desired simplification, the forces that can be transmitted through it are quite limited even though the pitch can be widely varied, due to the fact that the coupling of the ring to the rotating shaft is effected only through spring action that is independent of the loads imposed on the unit, and the resulting frictional bearing action that the ring surface makes on the shaft. When the weight or amount of resistance on the load being shifted exceeds the frictional forces acting between the shaft and the ring, slippage will occur, which will defeat the linear motion producing action desired.

A principal object of my invention is to provide a linear actuator of simplified form that provides high force conversion ratios with high efficiency and low speed for force applications over any desired distance, which is adapted to permit the use of electrical energy as its prime mover.

A further principal object of the invention is to provide a linear actuator in which the purchase that the motion converting components make with respect to the rotary and linearly moving elements increases up to reasonable limits as the load increases, making it possible to take full advantage of the force conversion ratios that are available.

Still a further object of the invention is to provide a ball bearing type unit that, while being no larger and less complicated than conventional shaft journaling ball bearing units, forms the heart of the mechanism for utilizing a rotating shaft to move a tube received thereover linearly, or vice versa, without using gearing, screw threading, or the like, and which, by adding duplicates of such unit to the shaft, will provide such output force acting linearly as may be desired.

Another principal object of the invention is to provide a linear actuator that is self compensating to overcome inertia and yet permits the operating motor therefor to operate at maximum output at all times, even under what would ordinarily be considered stall conditions.

In accordance with this invention, a linear actuator of wide basic utility is provided by employing a shaft member powered by a suitable conventional electric motor, a tubular member that is to be the linearly movable element receiving said shaft member, and a special ball bearing unit interposed between the shaft member and the tubular member, in which the bearing balls are journaled to rotate about parallel axes that are canted several degrees out of parallelism with the tubular and shaft members, and ride on the interior of the tubular member, and a wedge lock device acts between the balls and the shaft member to wedge lock the balls between the shaft and tubular members for resisting and overcoming forces acting longitudinally of such members. The wedge lock device comprises a composite inner race keyed to the shaft member in the form of ring members having oppositely tapering peripheries that, when placed adjacent each other when biased toward each other when disposed in engagement with the balls, bias the balls against the tubular member as well as forming an inner raceway for the balls. The bearing unit is no larger than conventional ball bearing units for journaling shafts, and where high force outputs are desired, bearing units are duplicated on the shaft as needed to meet requirements.

In one principal form of the invention, the bearing balls of the bearing unit automatically adjust to decrease pitch and increase the force conversion factors in overcoming inertia and moving heavy loads. In another principal form of the invention, the bearing balls are fixed in one standard operating position, and duplicate bearing units are added as required to provide the force output desired for any given situation.

Other objects of the invention are to provide a linear actuator type of force transmitting device that operates with high efficiencies in the range of 80 to 95 percent, to provide a force transmitting device that provides the above indicated advantages while having one-third the weight and occupying one-third the space of comparable devices, and to provide a linear actuator arrangement and bearing unit therefor that are economical of manufacture, convenient to use and capable of wide application in industry wherever linear movement of one element with respect to another is desired.

Other objects, uses, and advantages will be obvious or become apparent from a consideration of the following detailed description and the application drawings in which like reference numerals indicate like parts throughout the several views.

However, it is to be distinctly understood that the specific drawing illustrations provided are supplied primarily to comply with the requirements of the patent code, and that the invention may have numerous variations and applications that are intended to be covered by the appended claims.

GENERAL DESCRIPTION

Figures 1, 2, 3:
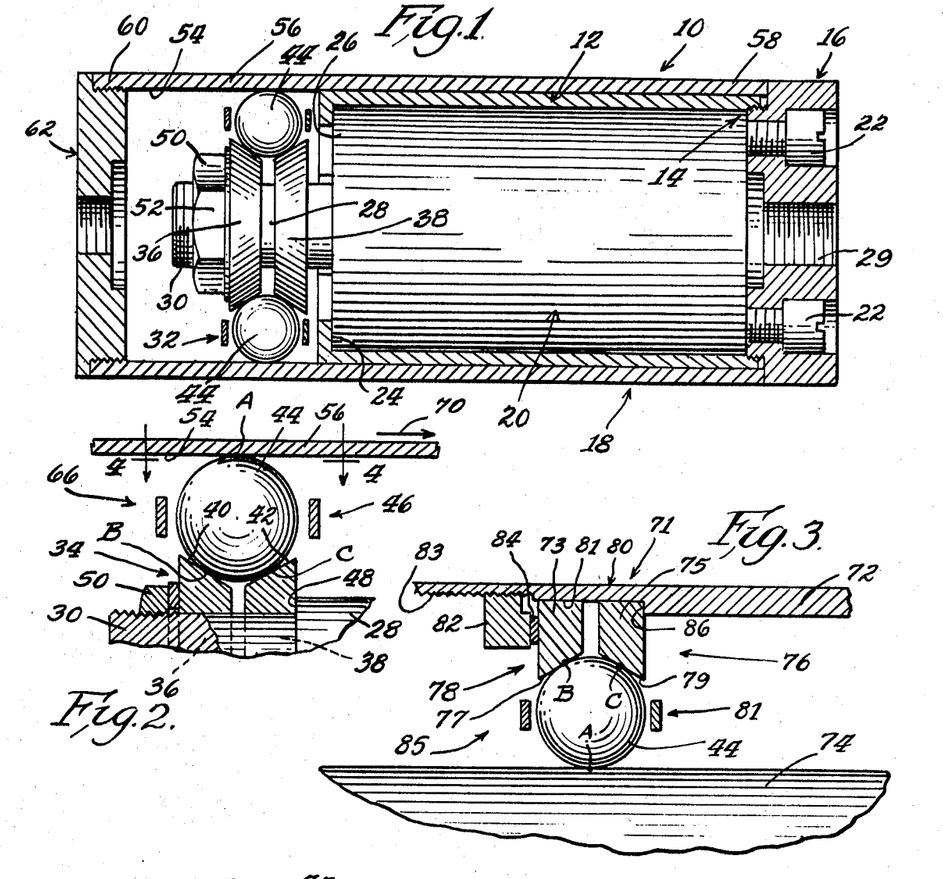
FIG. 1 is a longitudinal sectional view, partially in elevation, showing a specific linear actuator device arranged for commercial application and embodying the principles of this invention, with the motion converting bearing unit thereof being shown in block diagram form.
FIG. 2 is a diagram, in the form of a fragmental sectional view through one side of the motion converting bearing unit, illustrating the basic structural relationships involved in converting rotary motion to linear motion in accordance with this invention.
FIG. 3 is similar to FIG. 2 but illustrates an alternate application of the principles of this invention.

Reference numeral 10 of FIG. 1 generally indicates a linear actuator device arranged in accordance with this invention, which is illustrated as a fully consructed embodiment intended for practical application to any situation where one element or component is to be linearly moved with respect to the other, as for instance, opening and closing a door, or raising and lowering an automobile window.

The device 10 generally comprises a sleeve 12 having secured thereto as at 14 an end cap 16 to provide a housing 18 for suitable operating motor 20.

Motor 20 is secured in place by suitable bolts 22 applied between end cap 16 and the motor housing as well as by having sleeve 12 turned onto end cap 16 to dispose end flange 24 of sleeve 12 against the motor housing 26.

Motor 20 may be of any suitable type capable of driving a rotatable shaft 28, which shaft 28 is suitably journaled in any conventional manner in motor 20. Motor 20 is suitably connected to a suitable source of power as through opening 29 of end cap 16.

Figure 4:
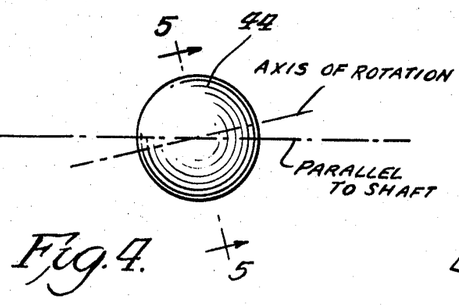
FIG. 4 is a diagrammatic view of the ball bearing element illustrated in the embodiment of FIG. 2, showing the angular relationship of its axis of rotation with respect to the longitudinal axis of the rotating shaft and tubular member that is moved linearly in the embodiment of FIG. 2, showing the ball as viewed substantially along line 4—4 of FIG. 2.

Mounted on the end 30 of shaft 28 is a novel ball bearing unit 32 arranged in accordance with this invention, which generally comprises (see FIG. 2) an inner race structure 34 in the form of a pair of rings 36 and 38 having their peripheries formed to define oppositely tapering wedge surfaces 40 and 42, respectvely, on which ride a plurality of bearing balls 44 mounted in a ball cage or retainer structure 46. As will be hereinafter described more in detail, the individual bearing balls 44 are journaled in the retainer structure 46 to rotate about parallel axes that are canted at an angle with respect to the longitudinal axes of shaft 28 and housing 18, as indicated in FIG. 4. The canting angle for the embodiments illustrated is on the order of two degrees while the angulation of surfaces 40 and 42 is 10 degrees off parallelism with the longitudinal axis of shafts 28, although the angulation in both instances is accentuated in the drawings for ease of viewing.

In the bearing unit 32, the inner race rings 36 and 38 are received over shaft end 30, which is reduced in diameter to define a shoulder 48. Nut 50 acting against lock washer 52 biases the ring 36 toward the ring 38 to cam the balls 44 outwardly into firm engagement with the internal surface 54 of a tubular member 56 that forms the linearly moving component of actuator 10. In the form shown tubular member 56 has its end 58 open to receive the housing 18 and its end 60 closed by end cap 62. Tubular member 56 is suitably connected to the element or component that is to be moved with respect to the element or component that end cap 16 is secured to (which may be done in any convenient manner).

In the bearing unit 32 and its equivalents here illustrated, bearing balls 44 are eight in number and are equally distributed about the circumference of retainer 32 that holds them so spaced. The application of the inner race structure 34 to the shaft 28 in the manner indicated against the bearing balls 44 establishes for each bearing ball the three points of contact indicated at A, B, and C which apply the respective bearing balls 44 against the surface 54 of tubular member 56 in a balanced manner and without backlash. The parts of the bearing unit are proportioned so that rings 36 and 38 do not contact each other, but are rather held in the indicated spaced apart relation by the interposed bearing balls 44 between their wedge surfaces 40 and 42 and tubular member 56.

In accordance with this invention, inner race structure 34 mounted as shown serves as a wedge lock interposed between the respective bearing balls 44 and shaft 23 such that the individual balls 44 and the wedging surfaces 40 and 42 dene a ball wedge lock 66 between shaft 28 and tubular member 56 which opposes movement of the tubular member 56 in either direction longitudinally of the shaft 28 under forces that may be acting longitudinally of tubular member 56 with respect to the shaft 28, while generating such movement in a controlled manner on rotation of shaft 28 relative to tubular member 56.

Figure 5:
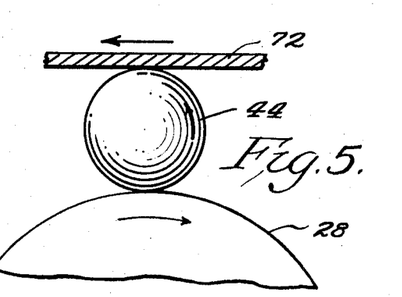
FIG. 5 is a diagram illustrating the rolling relationship between the ball element of FIG. 4, the tubular member it rolls on, and the wedge lock device that wedges same between the rotating shaft and the tubular member, FIG. 5 being a view substantially along line 5—5 of FIG. 4.

The angular relation of the axis of rotation of the bearing balls 44 that is indicated in FIG. 4 introduces a camming effect on tubular member 56, on rotation of shaft 28, which effects feeding movement, when desired, of tubular member 56 longitudinally and axially of housing 18. Rotation of shaft 28 in one direction will move tubular member 56 in one direction (see, for instance, FIG. 5) while rotation of shaft 28 in the opposite direction will move tubular member 56 in the corresponding opposite direction, all without screw threading or the like being formed in the surface 54 of tubular member 56.

The angular relation of the axis of rotation of the respective balls 44 with respect to the longitudinal axis of shaft 28 defines the pitch and corresponding feed rate of the device 10. As pitch is inversely proportional to the force conversion factors of the unit, in accordance with the applicable laws of mechanics, it will be seen that as zero pitch is approached, the force conversion factors approach innity, making theoretically available large force output capabilities at slow speed where an adequate purchase between the shaft 28 and the tubular member 56 can be achieved.

In accordance with this invention, the inner race structure 34 and the bearing balls 44, in providing a ball wedge lock device 66, provide the purchase desired which involves providing a locking pressure as a reaction to the restraining force involved. Thus, the balls 44 in being biased outwardly against the surface 54 of tubular member by the inner race surfaces 40 and 42 are centered between the two inner race forming rings 36 and 38, and are positioned such that when a load is acting on the tubular member 56 in the direction indicated by the arrow 70 of FIG. 2, the load acting on the tubular member 56 wedges the bearing balls 44 between the wedge surface 42 of ring 38 and the surface 54 of tubular member 56 whereby the greater the forces that are involved, the greater the locking action is provided; this permits transmittal through bearing unit 32 to tubular member 56 of the maximum forces made possible by the force conversion factors involved in the particular pitch that is used (either to hold tubular member 56 against movement, or to move same linearly as desired on operation of motor 20), up to the limits permitted by standard flat plate thrust bearing design (assuming housing 18 is suitably mounted to resist the action of the forces indicated by the arrow 70 as well as the counter forces generated by the operation of motor 20). Forces acting in the opposite direction provide a similar result, with the balls 44 being wedged between the surface 40 of ring 36 and the surface 54 of tubular member 56.

Figure 17:
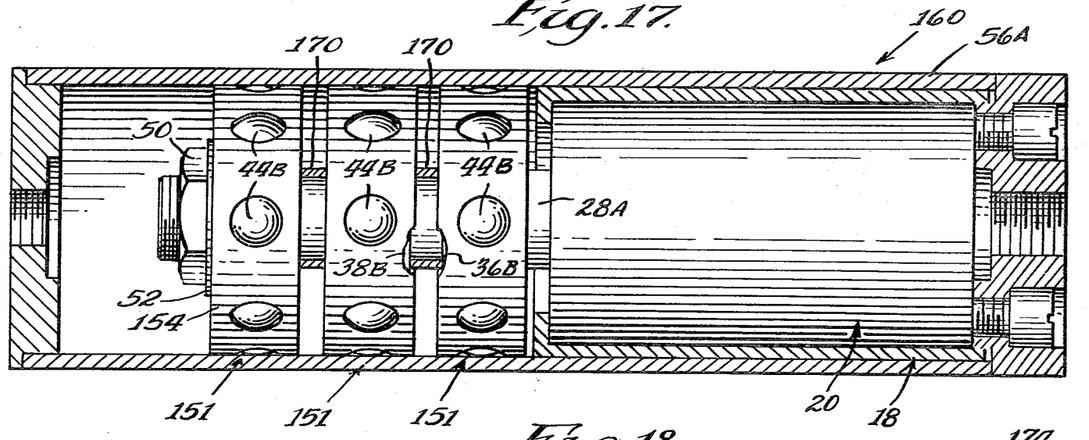
FIG. 17 is a view similar to that of FIG. 1 illustrating an embodiment of the invention in which the linear actuator is equipped with a plurality of bearing units of the type shown in FIGS. 12–16.
Figure 18:
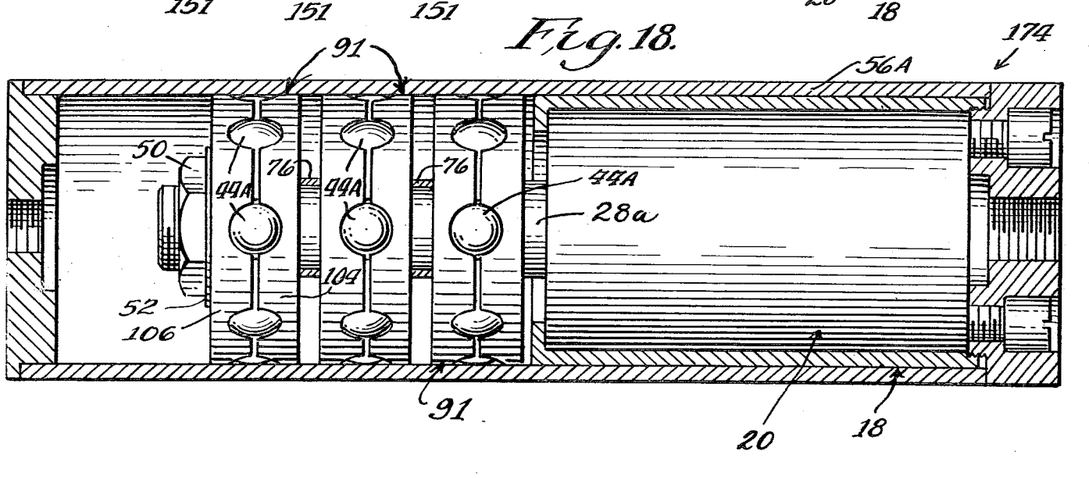
FIG. 18 is a view similar to that of FIG. 17, showing a linear actuator equipped with a plurality of bearing units of the type shown shown in FIGS. 6–11.

While the force transmittal limitations of standard flat plate thrust bearing structures are aplicable to the forces that can be transmitted between the bearing balls 44 of unit 28 and tubular member 56, in accordance with this invention, these limitations are readily overcome by merely adding duplicate bearing units 32 to the extent required to achieve the force output desired (see, for instance, FIGS. 17 and 18). All bearing units 32 can be identically constructed, and the bearing balls 44 of same are inclined at the same angulation out of parallellism with respect to the axis of rotation of shaft 28.

Further in accordance with my invention, by making the journaling arrangement of the bearing balls 44 such that the said angulation of the bearing balls shifts from the indicated angulation with respect to the axis of rotation of shaft 28 down to zero as load increases, even greater force output capabilities at slow speed are possible. For instance, assuming it is desired to have a minimum 100 to 1 force conversion ratio for any particular unit, is is known that a lead of about .060 inch is required to permit a one pound force applied about a radius of one inch to provide an output of 100 lbs. By providing for a 1 degree angulation of the bearing balls 44 with their points of contact A with the tubular member 56 being 1 inch from the axial center of shaft 28, a .060 inch lead will be provided.

In devices constructed in accordance with this invention in which the bearing ball angulation shifts under load, the pitch or lead of the device will decrease, reducing the speed of feed a corresponding amount, but correspondingly increasing the force magnification up to a theoretical infinity as the pitch is reduced to zero.

The principle involved may be better understood by making reference to the familiar first class lever which is the fundamental principle behind screw threading, as by assuming a force of 1 lb. acting through a leverage of 6 inches (the approximate circumference of a 2 inch diameter shaft), which provides a force of 100 lbs. acting through a distance of .060 inch on the other side of the fulcrum. As the .060 inch dimension decreases, the force available at that side of the fulcrum necessarily increases a corresponding amount in accordance with the laws of mechanics involved.

However, for many applications, the bearing balls 44 may be permanently mounted at a selected degree of angulation or canting with respect to the axis of rotation of the shaft as the force output requirements of the linear actuator unit will be well within design limitations. For instance, change of pitch is not required with applications where the motor 20 will be of the direct current type as the speed of the motor is adjustable for purposes of taking up the loads. Pitch adjustment is most useful under situations where stalling of the driving motor is likely to occur under reasonable operating conditions.

The embodiment shown in FIG. 3 illustrates that the principles involved in the invention can also be employed to move a shaft linearly by employing the rotation of the tubular member. In the hsowing of FIG. 3, the linear actuator 71 of that figure generally comprises a tubular member 72 mounted for rotation in any suitable manner in telescoping concentric relationship to shaft 74 that is to be moved axially thereof. Interposed between tubular member 72 and shaft 74 is bearing unit 76, which comprises an outer race structure 78 made up of ring members 73 and 75 that are respectively formed to define tapered wedge surfaces 77 and 79. Bearing balls 44 make the three point contact indicated at A, B and C that has been previously described in connection with the showing of FIG. 2 between the race structure and the member to be moved linearly, namely shaft 74 in the showing of FIG. 3.

In the embodiment of FIG. 3, the tubular member 72 is formed with a section 80 shaped to define a hex shaped internal surface section 81 with which the race rings 73 and 75 cooperate, the outer peripheries of the rings 73 and 75 being formed to complement the configuration of the surface section 81 of member 72. An internally threaded ring 82 threadedly received in internally threaded portion 83 of tubular member 72 and bearing against lock washer 84, with ring 75 seated against shoulder 86 of tubular member 72, biases the bearing balls 44 into wedging relation with the shaft 74 in a manner similar to that described relative to FIG. 3 to form wedge lock device 85.

The bearing balls 44 are journaled for rotation in a suitable cage structure or retainer 81.

Rotation of shaft 72 in either direction, as by employing a suitable motor and suitable means for coupling tubular member 72 thereto (not shown) will provide a feeding action of shaft 74 longitudinally thereof, the particular direction of feed being dependent on the directio.1 of rotation of the tubular member 72.

FIGS. 6–11 show a specific embodiment of the invention of the general type illustrated by FIG. 2 that is of the adjustable force conversion factor type, while the specific embodiment of FIGS. 12–16 is directed to the general arrangement of FIG. 2 embodied in a fixed force conversion factor type unit. FIG. 17 illustrates the embodiment of FIGS. 12–16 as it may be arranged for increasing the load output of the unit by adding duplicate bearing units thereto, while FIG. 18 provides a similar showing for the embodiment of FIGS. 6–11.

SPECIFIC DESCRIPTION

In the specific embodiment 90 of FIGS. 6–11, the housing 18 together with motor 10, shaft 28, tubular member 56, and its end cap 62 may be the same as shown in FIG. 1.

Figure 6:
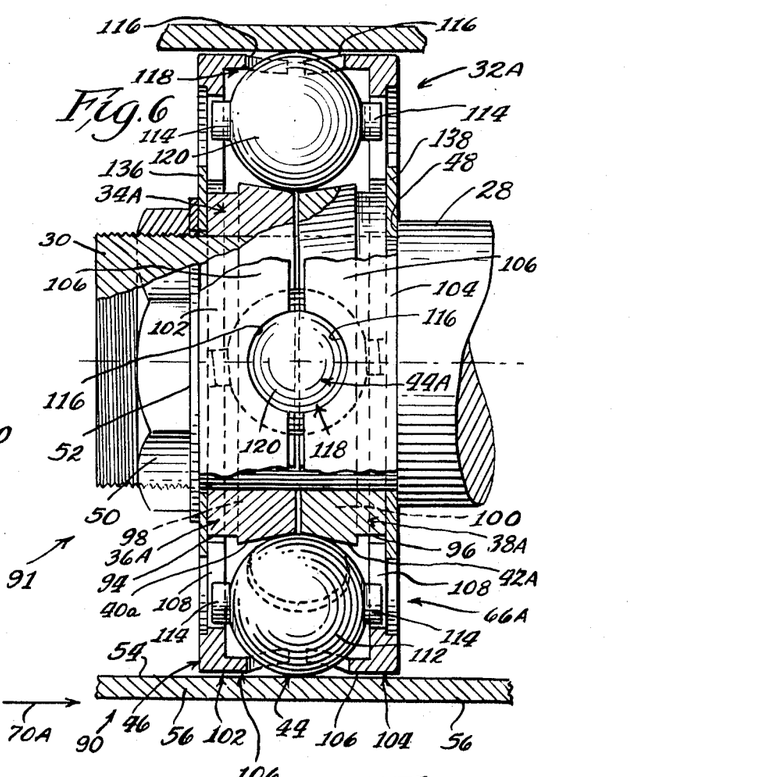
FIG. 6 is a view on an enlarged scale and partially in section illustrating the specifics of one bearing unit embodiment forming a part of this invention as incorporated in the linear actuator arrangement of FIG. 1.
Figure 7:
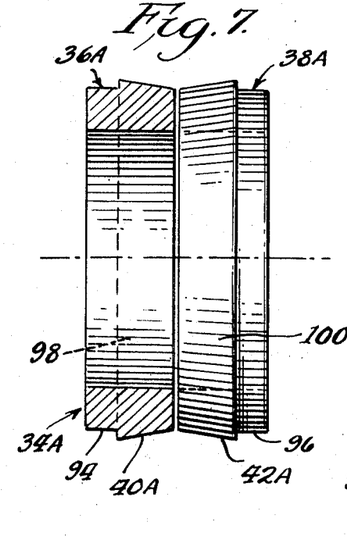
FIG. 7 illustrates the composite inner race structure that forms a part of the bearing unit of this invention.

The inner race structure 34A of bearing unit 91 generally comprises ring members 36A and 38A that are respectively formed with cylindrical portions 94 and 96 and frustoconical portions 98 and 100, the latter respectively defining tapered raceway forming or wedge surfaces 40A and 42A that are comparable to surfaces 40 and 42 of the showing of FIG. 2.

Figure 10:
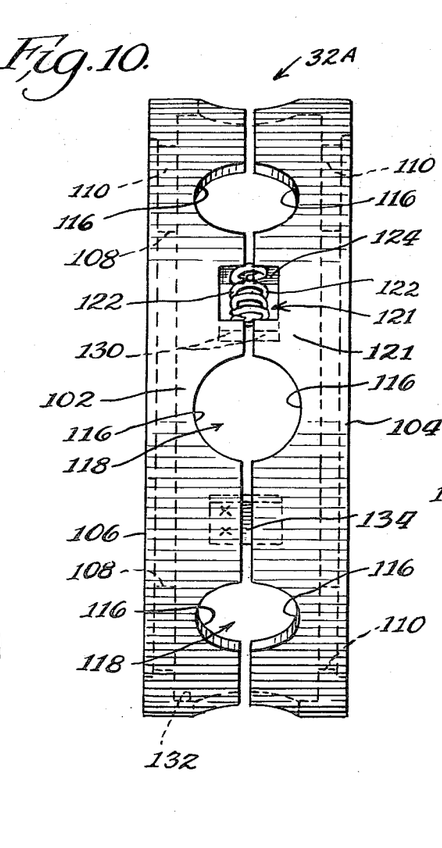
FIGS. 10 and 11 are an edge view and a side elevational view, respectively, of the bearing ball cage structure or retainer employed in the bearing unit embodiment of FIG. 6.
Figure 11:
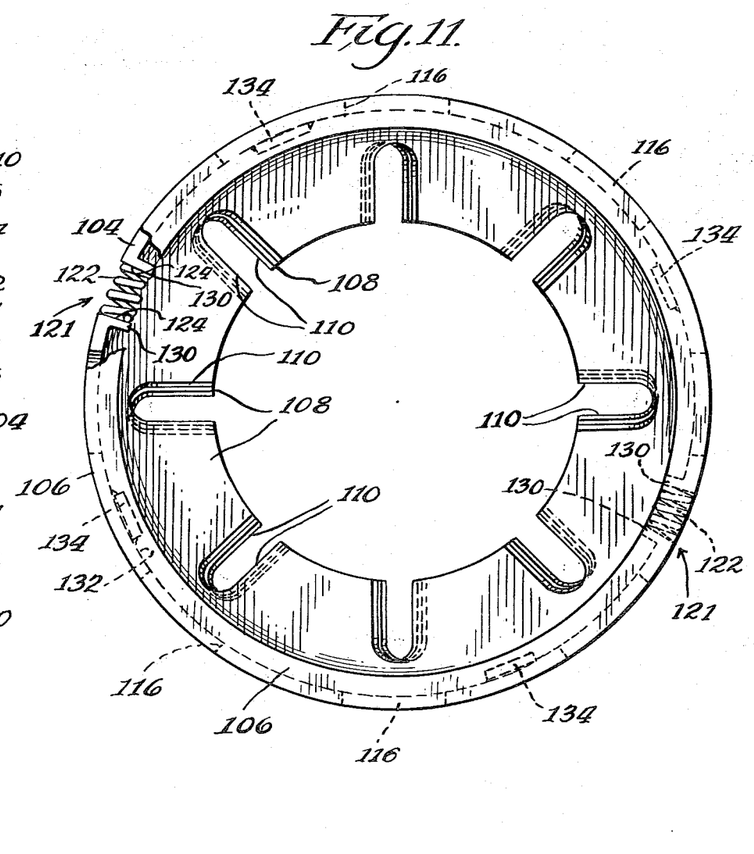

The cage structure or retainer 32A generally comprises a pair of ring members 102 and 104 each defining a rim portion 106 and flange portion 108 of like but opposite configuration. The respective flange portions 108 are each formed with a plurality of radially disposed mounting slots 110 for the purpose of journaling the bearing balls 44A in the bearing unit 91.

Figure 8:
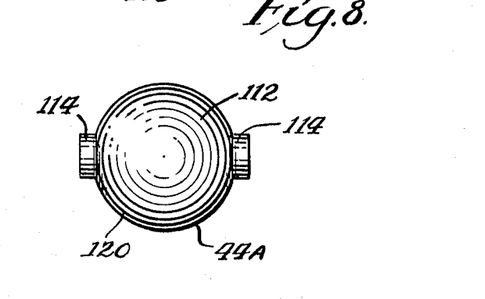
FIG. 8 is a plan view of one of the bearing balls forming a part of the bearing unit of this invention.

As indicated in FIG. 8, the bearing balls 44A each comprise a spherically contoured body 112 formed with a pair of oppositely directed arms or stub shaft portions 114 which are cylindrical in configuration and are proportioned to substantially complement the width of the respective slots 110.

The ring members 102 and 104 at their rim portions 106 are also each formed with complementing circular indentations 116, which when aligned, define spaced windows or apertures 118 through which the spherically contoured surface 120 of the respective bearing balls protrudes, when the race structure 34A is applied to shaft 28 in the manner indicated to form wedge lock device 66A, whereby balls 44A are placed in force transmitting relation with the tubular member 56 in the manner previously described in connection with the showing of FIGS. 1 and 2.

In the cage or retainer structure 32A, the orientation of the mounting slots 110 and aperture forming recesses 116 is such that when the recesses 116 are aligned to define the apertures 118, the bearing balls 44A have the canted position (with regard to their axes of rotation) indicated in FIG. 4 (which is intended to represent a canting on the order of two degrees from parallelism with shaft 28). The ring members 102 and 104 of cage structure 32A are biased to this position in any suitable manner, as by employing a suitable spring biasing device such as that indicated at 121 in FIGS. 10 and 11, which comprises a compression spring 122 of any suitable type seated between spaced spring seats 124 defined in the illustrated embodiment by suitable tabs 130 of the respective ring members 102 and 104. Ring member 102 has fixed thereto on the inside surface 132 of its rim portion 106 a plurality of spaced apart guide fingers 134 that engage the corresponding inside surface 132 of the rim portion 106 of ring member 104 for purposes of maintaining ring members 102 and 104 in appropriate centered relation. Spring seats 124 may include suitable projections extending up within the coils of the respective springs 122 at either end thereof in conventional spring seat forming manner, if so desired.

The bearing unit 91 as illustrated in FIG. 6 includes a pair of spaced apart discs 136 and 138 which serve to limit the movement of ring members 102 and 104 away from each other axially of the shaft 128.

Assuming that the end cap 62 of linear actuator 90 has been removed from tubular member 56, and the tubular member 56 has been applied over housing 18, the bearing unit is mounted on shaft 28 by applying to the shaft against its shoulder 48 the abutment forming disc 138, inner race forming member 38A and race structure ring member 104, bearing balls 44A, inner race ring member 36A, cage forming member 102, and abutment forming member 146, in that or any convenient order, after which lock washer 52 is tightened against the abutment forming member 136 by suitable nut 50 to establish the wedge lock device 66A that has been heretofore described.

In operation, the linear actuator will move the tubular member 56 in either direction on operation of motor 20, the specific direction of linear movement depending on the direction of rotation of the motor. Such linear movement of tubular member 56 is induced by the aforementioned camming action of balls 44A as they rotate about their axes of rotation on wedge surfaces 40A and 42A, and internal surface 54 of tubular member 56.

The compression spring devices 121 are arranged so that, in the normal operating position of unit 91, they bias the ring members 102 and 104 of cage structures 32A to the position where bearing balls 44A will have the canting illustrated in FIG. 4, which is preferably on the order of 2 degrees. Heavy loads acting on the tubular member 56 tending to impose movement of same longitudinally thereof result in a reaction being applied to the bearing ball members 44A which tends to decrease the degree of canting, and down to zero canting for extreme overload conditions. This results in a decrease in pitch and thus a decrease in linear speed of the tubular member 56, while increasing force conversion ratios to magnify the output force over the input force supplied by the operating motor 20.

This general relationship of parts permits my invention to achieve two significant objectives, namely making available at the tubular member 56 a large amount of linear actuating thrust for moving heavy loads (up to the limits permitted by standard flat plate thrust bearing design) while employing a drive of moderate torque capacity, and also enable the prime mover of the shaft 28 to operate at full capacity under both light loads as well as loads that would normally be considered enough to stall the motor, merely by providing for adjustment of the bearing unit 24 in accordance with the force conversion factor needed to handle the load. For load situations beyond the capacity of the mechanism, the zero pitch position is employed which permits the driving motor to operate at maximum output since no linear drive is being transmitted to the tubular member 56.

An important feature of this embodiment of the invention is that the bearing unit 91 is spring biased to maximum pitch position. Thus, forces acting on the tubular member in the direction indicated by the arrow 70A, or vice versa; will tend to shift the bearing balls 44A toward the zero pitch position in proportion to the force conversion factor requirements to overcome the resistance to movement of the tubular member 56, the spring devices 121 deflecting automatically under the load.

Figure 9:
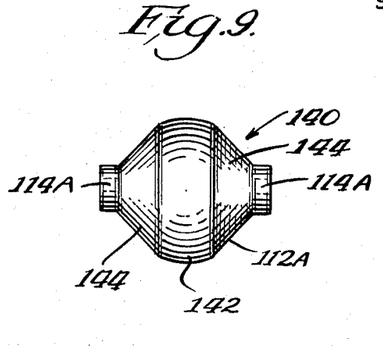
FIG. 9 is similar to FIG. 8 but illustrating a modified bearing ball.

FIG. 9 illustrates an alternate form of bearing ball 140 in which the body 112A of the ball comprises a spherically contoured mid portion 142 and frustoconical contoured end portions 144, which merge into cylindrical end portions 114A that are comparable to the end portions 114 of bearing balls 44A. The spherically contoured portion 142 has sufficient width axially of the end portions 114A to insure that only spherically contoured surface portions will engage the inner race structure raceway forming tapered surfaces 40A and 42A.

In the linear actuator 150 of FIGS. 12–16, the bearing unit 151 is of the simplified type shown in FIGS. 13–16. In this embodiment of the invention, the inner race structure 34B, lock washer 52, and nut 50 are the same as described in connection with the showing of FIGS. 6–9, as are the housing 18, motor 20, shaft 28, tubular member 56 and bearing balls 44B.

In this embodiment of the invention, the cage or retainer structure 32B generally comprises a one piece annular member 154 defining a rim portion 156 and spaced flange portions 158, the latter being formed to define ball bearing journaling slots 110A that are similar to the slots 110 of the embodiment of FIGS. 6–9.

Figure 14:
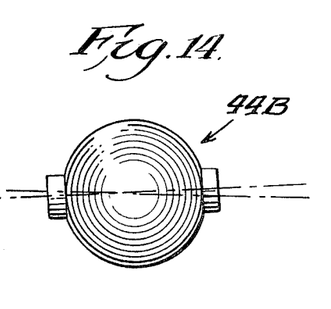
FIG. 14 is a view of one of the bearing balls shown in FIG. 13, taken substantially along line 14—14 of FIG. 13.
Figure 15:
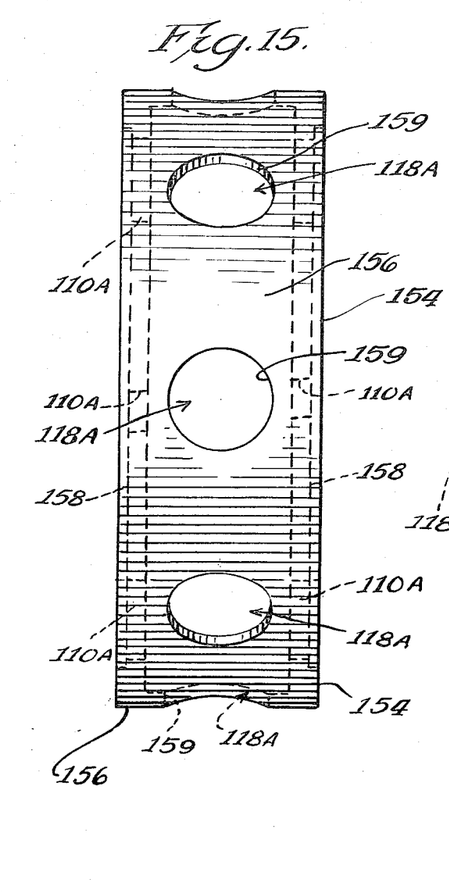
FIGS. 15 and 16 are an edge view and a side elevational view respectively of the cage structure or retainer of the bearing unit embodiment of FIGS. 1–14.
Figure 16:
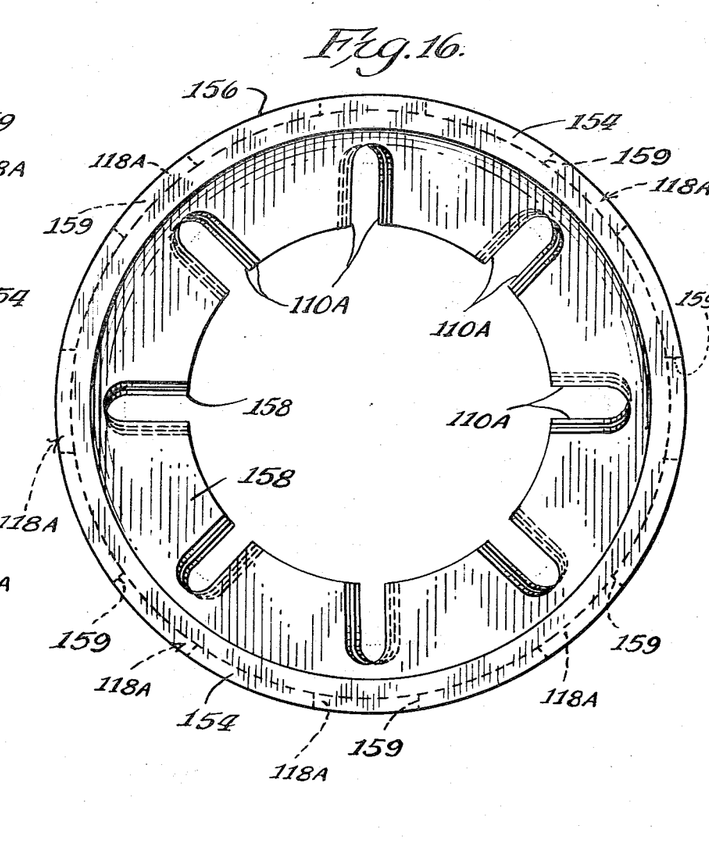

As indicated in FIG. 14, bearing balls 44B are the same as bearing balls 44A, with the slots 110A of the respective flange portions 158 of cage member 154 being oriented and aligned longitudinally of the shaft 28 such that bearing balls 44B have the canting orientation described in connection with the showing of FIG. 2.

In this simplified embodiment of the invention, the inner race forming ring members 36B and 38B are the same as members 36A and 38A respectively of FIG. 6 and are mounted on the shaft 28 in operative association with bearing balls 44B as applied to cage forming member 154, with the ring member 38B applied directly against shoulder 48 of the shaft. Nut 50 turned up against lock washer 52 establishes the wedge lock 66B between the shaft 28 and the tubular member 56, balls 44B projecting through perforating 159 of member 154 for rolling engagement with surface 54 of tubular member 56. The perforations 159 define windows or apertures 118A corresponding to windows or apertures 118 of FIG. 6.

Figure 12:
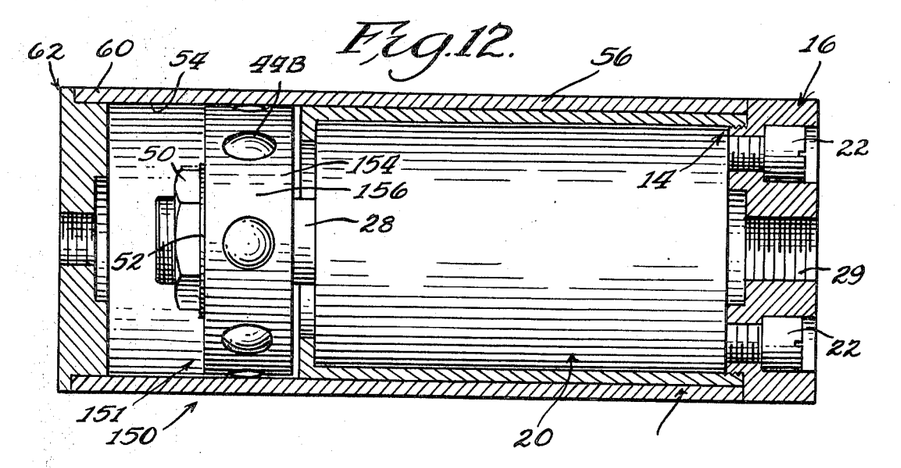
FIG. 12 is similar to that of FIG. 1 but illustrates a linear actuator equipped with a simplified bearing unit arranged in accordance with this invention.
Figure 13:
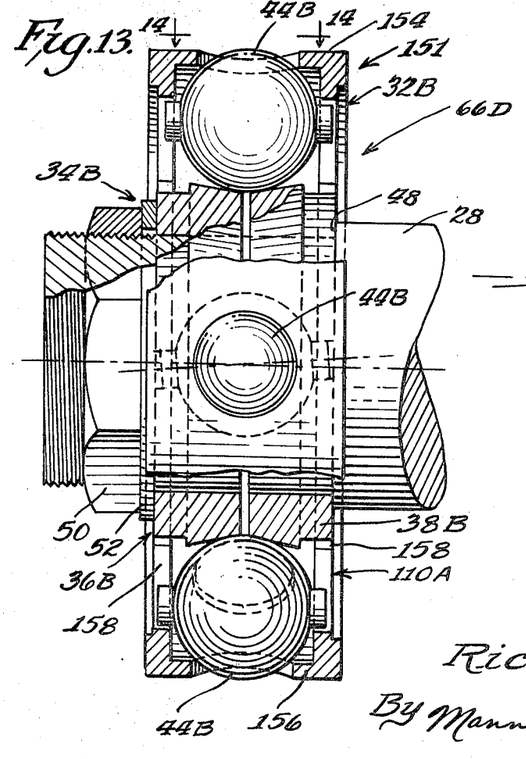
FIG. 13 is a view similar to that of FIG. 6 but illustrating the specific bearing unit of FIG. 12.

In operation, the linear actuator 50 has a fixed pitch and thus a fixed force conversion factor insofar as force output is concerned. A unit of this type has wide application for comparatively light load uses, such as for opening automobile windows and the like.

In accordance with this invention, linear actuators employing the bearing unit 151 can be increased in load output capacity by merely adding duplicate bearing units 151 as desired. This is illustrated in FIG. 17 in which the housing 18 and motor 20 of actuator 160 are the same as indicated in FIG. 1, while shaft 28A and tubular member 56A thereof are extended proportionally to accommodate the number of bearing units 151 desired. Three such bearing units 151 are illustrated, the middle bearing unit 151 being separated from the two end bearing units by suitable annular spacers 170.

FIG. 18 illustrates a linear actuator 174 of the general type shown in FIG. 17 in which the bearing units employed are of the type shown in FIG. 6, with the individual bearing units 91 being separated by suitable annular spacers 76.

DISTINGUISHING CHARACTERISTICS OF THE INVENTION

It will thus be seen that I have provided a simplified linear actuator arrangement employing rotary motion to provide linear motion which will operate under high force conversion ratios at low speed over a long distance and at high efficiencies. While the force output theoretically determinable by the angle of canting of the bearing balls is limited as a practical matter by standard flat plate thrust bearing force transmittal limitations, the force output of any particular unit can be increased as desired by providing an appropriate number of duplicate bearing units for the particular linear actuator in question.

The ball lock devices associated with the individual linear actuators of my invention effect a locking pressure as a reaction to the restraining force, and consequently, the greater forces involved, the greater locking action is provided. Consequently, forces that can be transmitted through the device can be the maximum that the strength of materials involved in any particular construction will accept without permanent yield, subject to the above indicated limitation, and, of course, strength requirements in individual cases can be accommodated by increasing dimensions and employing stronger materials, etc.

On the other hand, devices comparable to those illustrated may be quite small in longitudinal and transverse dimension so that use of same for such applications as for opening automobile windows is quite practical.

The travel to be accommodated can be selected by appropriately proportioning the parts that are to move relative to each other.

As rolling friction is all that adversely effects efficiency of operation of the bearing units involved, force transmittal efficiencies on the order of 80–95 percent are available.

It is thus apparent that devices constructed in accordance with this invention are especially adapted to provide linear movement under low speed operation with high forces and travels of any desired lengths and movements in either direction with equal facility. It will be apparent that applications for such device are enumerable, examples being circuit breakers, automobile window openers, door closers, automobile jacks, etc. In the embodiment of FIG. 6, the device automatically adjusts itself to provide the force output required to overcome resistance. Thus, this device accommodates inertia automatically and permits the driving motor to run at full output even under conditions that might ordinarily be considered to be of the stalling type.

Furthermore, the linear actuators of this invention provide linear motion in either direction with no backlash since the wedge lock provided acts in either direction with no slippage due to the clamping action that is involved on the race structure of the bearing unit.

It will also be noted that the bearing units illustrated are separate units in and of themselves and form the heart of the motion converting system involved in my invention. They are adapted to be separately made for application to existing motors to be provided with members to be moved linearly, such as tubular member 56 or shaft member 74.

While bearing balls have been illustrated as forming the motion converting implement, in the illustrated forms of the invention, roller bearings and other roller bearing types can readily be adapted to serve the same purpose. These elements and their equivalents are termed "rolling bearings" in one or more of the appended claims.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:
1. A linear actuator comprising:
a shaft member,
a tubular member received over said shaft member in concentric telescoping relation thereto,
means for rotating said shaft member,
a rolling bearing unit interposed between said members, said bearing unit comprising:
an inner race mounted on said shaft member and comprising a pair of ring members having their peripheries oppositely tapered to converge radially inwardly thereof,
means for resiliently biasing said inner race ring members together,
a plurality of ball members riding on said tubular member and said peripheries of said inner race members, said biasing means and said tapered peripheries of said ring members wedging said ball members between said ring members and said tubular member with said ring members disposed in spaced relation,
and an annular cage structure received about said shaft and in concentric relation to said inner race, and
means for journaling said ball members in said cage structure for rotation about axes that are canted at an acute angle with respect to the longitudinal axis of said shaft and tubular member,
said ball members being disposed substantially equidistantly about said inner race and said ball axes being substantially equally canted.
2. The linear actuator set forth in claim 1 wherein:
said inner race member peripheries are tapered to define 10 degree angled surfaces on which said ball members ride, and wherein said ball member axes are canted on the order of two degrees.

3. The linear actuator set forth in claim 1 wherein:

said cage structure comprises a pair of annular flange portions spaced apart axially of said shaft and tubular member and receiving said ball members between same, said ball members each being formed to define oppositely extending shaft portions, said flange portions being slotted to receive the respective shaft portions of the respective ball members, said cage structure slots and said shaft portions of said ball members comprising said journaling means.

4. A rolling bearing unit adapted to serve as a motion transmitting connection between a rotatable shaft and a tubular member to be moved axially thereof and disposed in concentric telescoping relation with the shaft, said bearing unit comprising:

an inner race adapted to be mounted on said shaft member and comprising a pair of ring members having their peripheries oppositely tapered to converge radially inwardly thereof, means for resiliently biasing said inner race ring members together, a plurality of ball members adapted to ride on the tubular member and said peripheries of said inner race members, said biasing means and said tapered peripheries of said ring members being adapted to wedge said ball members between said ring members and the tubular member with said ring members disposed in spaced relation, an annular cage structure received about and in concentric relation to said inner race, and means for journaling said ball members in said cage structure for rotation about axes that are canted at an acute angle with respect to the longitudinal axis of said inner race, said ball members being disposed substantially equidistantly about said inner race and said ball axes being substantially equally canted, said cage structure comprises a pair of annular flange portions spaced apart axially of said inner race and receiving said ball members between same, said ball members each being formed to define oppositely extending shaft portions, said flange portions being slotted to receive the respective shaft portions of the respective ball members, said cage structure slots and said shaft portions of said ball members comprising said journaling means.

5. The bearing unit set forth in claim 4 wherein:

said cage structure flange portions are in fixed relation to each other.

6. The bearing unit set forth in claim 4 wherein:

said cage structure flange portions are adjustable relative to each other about the axis of said inner race whereby said cant of said ball member axes is adjustable.

References Cited

UNITED STATES PATENTS

| | | | |
|---|---|---|---|
| 2,940,322 | 6/1960 | Uhing | 74—25 |
| 3,046,800 | 7/1962 | Pravel | 74—25 |
| 3,256,743 | 6/1966 | Valliere | 74—25 |

FOREIGN PATENTS

| | | | |
|---|---|---|---|
| 353,595 | 5/1961 | Switzerland | 74—25 |

M. CARY NELSON, Primary Examiner

W. S. RATLIFF, Jr., Assistant Examiner